(12) United States Patent
Kleen et al.

(10) Patent No.: US 11,904,688 B2
(45) Date of Patent: Feb. 20, 2024

(54) METHOD FOR CALCULATING AN AR-OVERLAY OF ADDITIONAL INFORMATION FOR A DISPLAY ON A DISPLAY UNIT, DEVICE FOR CARRYING OUT THE METHOD, AS WELL AS MOTOR VEHICLE AND COMPUTER PROGRAM

(71) Applicant: Volkswagen Aktiengesellschaft, Wolfsburg (DE)

(72) Inventors: Andro Kleen, Braunschweig (DE); Robert Jan Wyszka, Hannover (DE); Vitalij Sadovitch, Braunschweig (DE); Adrian Haar, Hannover (DE); Johannes Tümler, Wellen (DE); Michael Wittkämper, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 821 days.

(21) Appl. No.: 16/977,059

(22) PCT Filed: Feb. 12, 2019

(86) PCT No.: PCT/EP2019/053461
§ 371 (c)(1),
(2) Date: Aug. 31, 2020

(87) PCT Pub. No.: WO2019/166222
PCT Pub. Date: Sep. 6, 2019

(65) Prior Publication Data
US 2021/0046822 A1   Feb. 18, 2021

(30) Foreign Application Priority Data
Mar. 2, 2018 (DE) .......................... 102018203121.5

(51) Int. Cl.
*B60K 35/00* (2006.01)
*B60W 50/14* (2020.01)
*B60W 40/06* (2012.01)

(52) U.S. Cl.
CPC ............. *B60K 35/00* (2013.01); *B60W 40/06* (2013.01); *B60W 50/14* (2013.01);
(Continued)

(58) Field of Classification Search
None
See application file for complete search history.

(56) References Cited

U.S. PATENT DOCUMENTS 10,777,082 B2 * 9/2020 Ohta ...................... G08G 1/166
10,924,679 B2 * 2/2021 Lee ......................... G06V 20/56
(Continued)

FOREIGN PATENT DOCUMENTS

DE  102005062151 A1  7/2007
DE  102012222053 A1  6/2013
(Continued)

*Primary Examiner* — Ryan Rink
(74) *Attorney, Agent, or Firm* — Peter Zura; LOZA & LOZA, LLP

(57) ABSTRACT

Technologies and techniques for calculating an overlay of additional information for a display on a display unit. The overlay of additional information may support the driver in the longitudinal control of a vehicle. The overlaying of the additional information may be configured in the form of augmented reality such that it is calculated in a contact analogue manner in relation to one or more objects in the environment of the vehicle. When approaching a vehicle, a spatially extended animation graphic is calculated, wherein the animation graphic has a grid shape consisting of a plurality of grid elements, which extends from the observer vehicle up to the oncoming or preceding vehicle. The spatial extension is calculated such that the driver of the observer (Continued)

vehicle (10) has the impression of a kinematic or dynamic movement of the spatial extension, such as translation and rotation.

18 Claims, 6 Drawing Sheets

(52) U.S. Cl.
CPC .. *B60K 2370/165* (2019.05); *B60K 2370/177* (2019.05); *B60K 2370/178* (2019.05); *B60K 2370/179* (2019.05); *B60W 2050/146* (2013.01); *B60W 2554/80* (2020.02)

(56) References Cited

U.S. PATENT DOCUMENTS

| | | | |
|---|---|---|---|
| 2010/0292886 A1* | 11/2010 | Szczerba | G01S 13/723 701/31.4 |
| 2014/0354692 A1* | 12/2014 | Ng-Thow-Hing | G02B 27/01 345/633 |
| 2014/0362195 A1* | 12/2014 | Ng-Thow-Hing | G06V 40/20 348/51 |
| 2016/0240012 A1* | 8/2016 | Gruenler | G01C 21/3602 |
| 2016/0264045 A1* | 9/2016 | Ng-Thow-Hing | G01S 13/931 |
| 2016/0332569 A1* | 11/2016 | Ishida | B60W 50/16 |
| 2017/0154554 A1* | 6/2017 | Tanaka | G08G 1/167 |
| 2017/0187963 A1* | 6/2017 | Lee | G02B 27/01 |
| 2017/0253181 A1* | 9/2017 | Choi | B60R 1/00 |
| 2018/0118224 A1* | 5/2018 | Arita | G08G 1/165 |
| 2018/0174463 A1* | 6/2018 | Ohta | B60W 30/08 |
| 2018/0208111 A1* | 7/2018 | Lisseman | G02B 6/0036 |
| 2018/0322673 A1* | 11/2018 | Choi | G06V 20/588 |
| 2019/0248240 A1* | 8/2019 | Fujita | B60K 35/00 |
| 2020/0258480 A1* | 8/2020 | Bronder | G08G 1/0962 |
| 2022/0171590 A1* | 6/2022 | Seitz | B60K 35/00 |
| 2023/0322248 A1* | 10/2023 | Weiss | B60W 40/04 340/435 |

FOREIGN PATENT DOCUMENTS

| | | |
|---|---|---|
| DE | 102013016251 A1 | 6/2014 |
| DE | 102014008152 A1 | 10/2014 |
| DE | 102013016241 A1 | 4/2015 |
| DE | 102013016242 A1 | 4/2015 |
| DE | 112013002354 T5 | 4/2015 |
| DE | 102014219575 A1 | 7/2015 |
| DE | 102015117381 A1 | 4/2016 |
| DE | 102014119317 A1 | 6/2016 |
| DE | 102015116160 A1 | 3/2017 |
| DE | 102016203080 A1 | 8/2017 |
| DE | 112016001259 T5 | 11/2017 |

* cited by examiner

METHOD FOR CALCULATING AN AR-OVERLAY OF ADDITIONAL INFORMATION FOR A DISPLAY ON A DISPLAY UNIT, DEVICE FOR CARRYING OUT THE METHOD, AS WELL AS MOTOR VEHICLE AND COMPUTER PROGRAM

RELATED APPLICATIONS

The present application claims priority to international patent app. no. PCT/EP2019/053461 to Andro Kleen, et al., filed Feb. 12, 2019, which claims priority to German patent app. no. DE 10 2018 203 121.5, filed Mar. 2, 2018, the contents of each being incorporated by reference in their entirety herein.

BACKGROUND

The present disclosure relates to driver information systems, also known as infotainment systems. In particular, it relates to technologies and techniques for displaying a safety zone in front of a vehicle or an object on a display unit in a system, such as a vehicle system. The present disclosure can also be used in the context of pedestrians, bicyclists, etc. wearing data glasses. The present disclosure also relates to a correspondingly designed device for executing the method, and a vehicle, and a computer program.

Technologies are currently being developed at a fast rate, which will later be used to enable autonomous driving. A first approach involves not entirely freeing a driver of driving duties, but instead requiring that the driver be able to assume control of the vehicle at any time. The driver also assumes the responsibility of monitoring functions. Newer technologies in the field of driver information systems such as a head-up display (HUD) inform the driver better of events occurring in the environment of his vehicle.

It can therefore be assumed that in the future, comprehensive information regarding an object (in particular vehicles) in the direct environment of the actual vehicle will be made available on the part of the system through the use of newer technologies (vehicle-to-vehicle communication, use of data bases, vehicle sensor systems, etc.). The following components in particular, which enable observation of an environment, are relevant in the field of vehicle sensor systems: radar devices, standing for "radio detection and ranging," lidar devices, standing for "light detection and ranging," primarily in the field of distance detection/warning, and cameras that have a corresponding image processing for the field of object recognition. Such data regarding the environment can be used as a basis for driver recommendations, warnings, etc. on the part of the system. By way of example, displays/warnings are conceivable regarding which direction (possibly in the same trajectory) another vehicle in the environment will turn.

Vehicle-to-vehicle communication has meanwhile become possible using mobile communication with systems such as LTE, standing for "long term evolution." In this case, a specification called LTE V2X has been adopted by the organization 3GPP. Alternatively, there are also systems based on WLAN technologies for direct communication between vehicles, in particular WLAN p.

The term, "autonomous driving," is used a number of different ways in the relevant literature.

Autonomous driving (also referred to as automatic driving, automated driving, or piloted driving) refers to the movement of vehicles, mobile robots, and driverless transport systems, which are substantially autonomous. There are various levels for the term, "autonomous driving." Autonomous driving also refers to when there is still a driver in the vehicle, who potentially only monitors the automatic driving process. The various traffic ministries in Europe (including the Federal Highway Research Institute on behalf of Germany) have worked together and defined the following degrees of autonomy:

Level 0: "Driver Only," the driver himself steers, accelerates, brakes, etc.

Level 1: Certain assistance systems aid in operating the vehicle (distance regulating system, automatic cruise control (ACC), etc.).

Level 2: Partial automation. Automatic parking, tracking functions, general longitudinal guidance, acceleration, braking, etc. are assumed by the assistance systems (including traffic assistance).

Level 3: Highly automated. The driver does not need to continuously monitor the system. The vehicle independently executes functions such as activating blinkers, lane changes, and tracking. The driver can pay attention to other things, but may be asked by the system, with an advance warning period, to assume driving of the vehicle. This form of autonomy is technologically possible on highways. Lawmakers are trying to allow level 3 vehicles. Legal boundary conditions have already been formulated for this.

Level 4: Full automation. The vehicle is continuously driven by the system. If the system is unable to master the driving tasks, the driver can be asked to assume these driving tasks.

Level 5: No driver necessary. Aside from determining the destination and starting up the system, human involvement is unnecessary.

The automated driving functions starting at level 3 relieve the driver of responsibility of controlling the vehicle.

Because of current developments toward higher autonomy levels, while many vehicles will still be controlled by a driver, it can be assumed that corresponding additional information can already be used in the short term for manually driven vehicles, and in the long term for highly automated systems.

There is a question with vehicle-to-vehicle communication of how this information can be presented such that it actually benefits a human driver, and can also be quickly and intuitively accessed. The following approaches in this field are already known from the prior art.

One vision of the future in the automotive industry is to be able to populate the windshield of the vehicle with virtual elements for the benefit of the driver. So-called "augmented reality" technology (AR) is used. This is also referred to in German as "erweiterten Realität" [EN: "enhanced reality"]. The actual environment is enriched with virtual elements therewith. This has numerous advantages: It is not necessary to look down at displays instead of the windshield, because much of the relevant information is displayed on the windshield. As a result, the driver does not have to look away from the road. Furthermore, through the precise locating of the virtual elements in the actual environment, the driver is less apt to be distracted, because it is not necessary to interpret a graphic element on a separate display. This is also beneficial with regard to automatic driving.

Because the technological means are currently limited in this regard, it can be assumed that a fully populated windshield will not immediately be available in vehicles. Heads-up displays (HUD) are currently used in vehicles. These also have the advantage that the image in the HUD more closely resembles the real environment. These displays are actually projection units that project an image onto the windshield. This image appears to the driver to be from a few to 15 meters in front of the vehicle, depending on the type of module. This has the advantage that the overlaid information is presented such that the driver does not have to look away from the windshield.

The "image" is composed in the following manner: this is not so much a virtual display as a type of "keyhole" view into the virtual world. The virtual environment is theoretically overlaid onto the real world, and contains the virtual objects that aid and inform the driver while driving. The limited display area of the HUD means that only an excerpt of the virtual world is presented. One therefore looks through the display surface of the HUD at this excerpt of the virtual world. Because this virtual environment enhances the real environment, this is also referred to as a "mixed reality."

A head-up display unit for a vehicle that generates a virtual image in the driver's field of vision is known from DE 10 2015 116 160 A1. Information is displayed therewith that relates to current driving conditions.

A method for obtaining an augmented display of at least some additional information in at least one recorded digital image of an environment, in particular a vehicle environment, is known from DE 10 2013 016 241 A1. It may also be the case that this additional information can be output in a two-dimensional image or a three-dimensional image, in particular depending on the event, and potentially in an alternating manner. By way of example, additional information output as an additional object, e.g. a traffic sign, can be overlaid on a 3D display, and/or it can be overlaid on the 2D display in the output image as additional information in text form, in particular labeling a real or virtual object in the output image.

A method for obtaining an augmented display of at least some additional information in at least one image of an environment, in particular a vehicle environment, is known from DE 10 2014 008 152 A1. In comparison with conventional augmented display methods with a precise placement of the virtual objects, thus placing the virtual objects directly on respective associated objects, e.g. based on the GPS position, the invention enables the virtual additional information to be placed in an optimal location by outputting the virtual additional information in a previously determined area in the display, in particular avoiding overlaying it on other real or virtual objects in the display image.

A method for displaying an element superimposed on an image of a portion of a motor vehicle's environment is known from DE 10 2014 119 317 A1. The image is displayed on a display surface in the motor vehicle. Furthermore, at least one object from the portion of the environment is displayed in the image. It is also intended that the element superimposed on the image is linked to the object, such that it moves therewith and is displayed at the same location in relation to the object when the object moves in the display, wherein the direction and/or size of the superimposed element is adapted to the object with regard to a change in direction and/or change in size of the object. As a result, the superimposed element can be adapted to the surface of the road. If the road inclines, for example, when climbing a hill, this can be detected on the basis of the three-dimensional information regarding the object, and the display of the superimposed element can be adjusted accordingly with regard to the orientation and shape of the object.

A head-up display (HUD) is known from DE 10 2015 117 381 A1 on which context-based information is displayed to the driver. This information may relate to environmental conditions and/or conditions relating to the physiology of the user.

A major advantage of the previously known "augmented reality" displays (AR displays) is that these displays are displayed directly within, or as part of, the environment. Relatively obvious examples relate for the most part to the field of navigation. While classic navigation displays (in conventional HUDs) normally display schematic images (e.g. a right angle arrow pointing toward the right indicates a right turn at the next opportunity), AR displays offer substantially more effective possibilities. Because the displays can be shown as "part of the environment," they can be interpreted by the user extremely quickly and intuitively. Nevertheless, the previously known approaches have various problems that have not yet been solved at this time.

The known solutions have various disadvantages. This is acknowledged in the framework of the present disclosure. One of the problems with the known solutions is that the cognitive interpretation and the understanding of AR overlays in a HUD require a few milliseconds of the driver's attention. The processing of this information may vary depending on the situation, and may lead to wrong interpretations or misunderstandings. This may result in dangerous situations. By way of example, although the driver is shown the route to be driven via a conventional overlaying of the navigation route, this does not inform the driver clearly enough that there is a risk potential at a narrow section on the road due to an oncoming vehicle. Moreover, the location of the narrow section is not emphasized with sufficient precision in the driver's field of vision.

There is therefore a desire for further improvements in the longitudinal and transverse control of a vehicle, and providing information to the driver in this regard via the infotainment system.

BRIEF DESCRIPTION OF THE DRAWINGS

Exemplary embodiments of the invention are shown in the drawings, and shall be explained in greater detail below in reference to the figures.

Therein.

DETAILED DESCRIPTION

Figure 1:
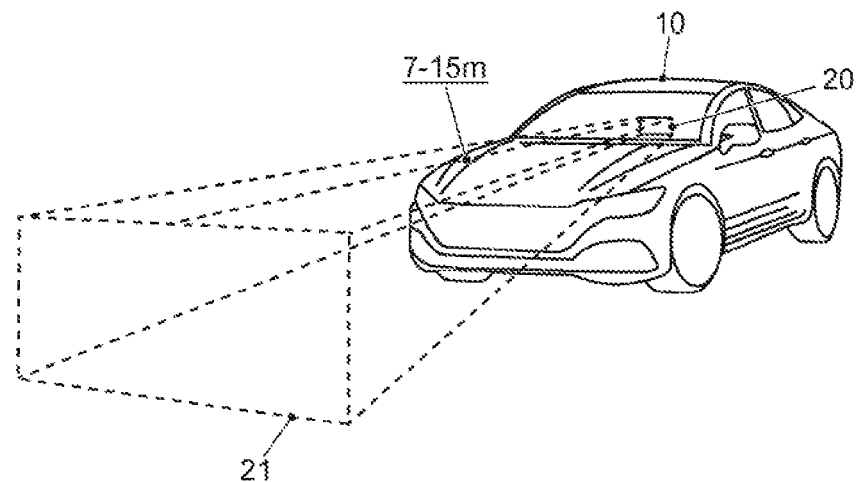
FIG. 1 shows the principle of overlaying information in the driver's field of vision while driving a vehicle, using a head-up display according to some examples.

The present description illustrates the principles of the disclosure according to the invention. It is understood that persons skilled in the art are capable of conceiving of different arrangements that may not be explicitly described herein, but still embody the principles of the disclosure according to the invention, and should likewise be protected.

The present disclosure illustrates technologies and techniques for calculating an overlay of additional information for display on a display unit, in particular a head-up display (HUD) in a vehicle or data glasses, a device for executing the method, and a motor vehicle and a computer program for executing the same. The overlaying of additional information in the various examples aids the driver in controlling the vehicle in the longitudinal and transverse directions.

In various examples, the behavior of the elements in the AR overlays, e.g. lines, surfaces and other geometric elements are physically "animated". This results in a better communication of the urgency of an interaction.

An intuitive interpretation of a current driving condition is facilitated by the physical behavior of the elements in AR overlays on the HUD. Known behavior patterns that a person learns in the course of a lifetime, or are even instinctual, are exploited for understanding AR overlays on a HUD more quickly and accurately. Dynamics, frequencies and rotations are used for this, such that two- and three-dimensional elements move around in the digital space. Lines, surfaces, and geometric elements reflect physical behaviors and properties known from the real world. Human intuitive awareness quickly processes the overlaid information in the HUD.

In one example, an AR overlay is calculated, i.e. an "augmented reality" overlay, that includes additional information for display on a display unit, in particular a head-up display (HUD) in an observer vehicle, or data glasses, wherein the additional information is overlaid to aid the driver in the longitudinal and/or transverse control of an observer vehicle. The AR overlay is calculated as an enhanced reality, i.e. "augmented reality," in a contact analogue manner in relation to one or more objects in the environment of the observer vehicle. The position of an oncoming or preceding vehicle or object is detected. Upon approaching the oncoming or preceding vehicle, a spatially expanded animation graphic is calculated, wherein the animation graphic contains a grid composed of numerous grid elements extending from the observer vehicle to the oncoming or preceding vehicle. A special aspect of this is that the spatial expansion is calculated such the driver of the observer vehicle has the impression of a kinematic or dynamic movement of the spatial expansion, e.g. a translatory or rotational movement.

In some examples, a spatial expansion is calculated such that the driver of the observer vehicle has the impression of an approaching or receding wave. The animation of the waveform can be designed such that the wave can move along the x, y, or z axes.

In another embodiment, an animation graphic is calculated such that the spatial expansion of the animation graphic is periodically repeated, such that the driver of the observer vehicle has the impression that a number of wave trains are approaching or receding.

In another variant, one or two spatially expanded animation graphics are calculated to aid in lateral control of the vehicle, which are overlaid at the sides of the route, wherein these animation graphics contain a grid composed of numerous grid elements, and the spatial expansion is calculated such that the grid aggregates spatially at a position to the side where an obstacle or oncoming vehicle has been detected, in order to emphasize a narrowing of the route.

The aim of the aggregating of elements is to better communicate warnings. The aggregating, or extrusion, of elements can take place in any axis, to any extent.

Other variants comprise individual elements moving around an object and physically drawn toward it, or impacted by it. As a result, distances are visualized and can be emphasized. One-dimensional or two-dimensional elements are extruded from planes in order to indicate urgencies, or prioritize certain regions in the HUD or the real world. The physical behavior of the AR overlays may be useful for the driver in a number of ways.

Another advantage of the method may be obtained by estimating the width of the narrow section, and calculating an animation graphic if this width is less than a minimum width, such that the at least one grid-like animation graphic for lateral control of the vehicle is converted to a notification symbol indicating the necessity for an evasive maneuver. When elements are linked to specific locations/coordinates in the real world, resulting in a concentration thereof, the focus of the driver's attention can be directed thereto.

This allows for a particularly intuitive form of the conversion, wherein the conversion of the animation graphic is calculated such that the grid elements in the animation graphic aiding in lateral control move in the manner of a swarm during the conversion phase, resulting in the notification symbol at the end of the conversion phase. An overlaying and automatic visual intensification is obtained through the swarm-like behavior of the lines, surfaces, and geometric elements linked to the respective coordinates in the real world.

It is therefore also advantageous when the further animation graphic aiding in the lateral control of the vehicle is calculated such that it indicates the path of the oncoming vehicle or object. This "linking" of elements can be used, e.g. for functions relating to marking a region or object, but also for indicating a pathway or for drawing attention to such an object.

The advantages of the device for executing the method are the same as those of the corresponding steps with a computer programmed to execute the method.

It is particularly advantageous when the display unit in the device is a head-up display. Instead of a head-up display, data glasses or a monitor can be used as the display unit in the device, on which a camera image containing the grid overlay is displayed.

Advantageously, the device according to the invention can be used in a motor vehicle. The invention is preferably implemented in a vehicle such that the display is permanently installed in the vehicle, e.g. in the form of a head-up display. It is nevertheless possible to implement the device using data glasses, if this use of data glasses is allowed for driving in the future.

As stated above, the present disclosure can also be used advantageously when the display unit comprises data glasses. In this case, the method according to the invention can also be used by pedestrians, bicyclists, and with motorcycles, etc.

A computer program that is run in the computing unit in the device for executing the method according to the invention also has the same advantages as the method according to the invention described above.

FIG. 1 illustrates an exemplary functioning of a head-up display. The head-up display 20 is installed below/behind the instrument panel in the dashboard. Additional information is overlaid in the driver's field of vision by the projection onto the windshield. This additional information appears as though it is projected onto a projection surface 21 at a distance of 7-15 meters in front of the vehicle. The real world still remains visible through this projection surface 21. A virtual environment is basically generated with the overlaid additional information. The virtual environment is theoretically superimposed on the real world, and contains the virtual objects that aid and inform the driver while driving. It is only projected, however, on a portion of the windshield, such that the additional information is not placed arbitrarily in the driver's field of vision.

Figure 2:
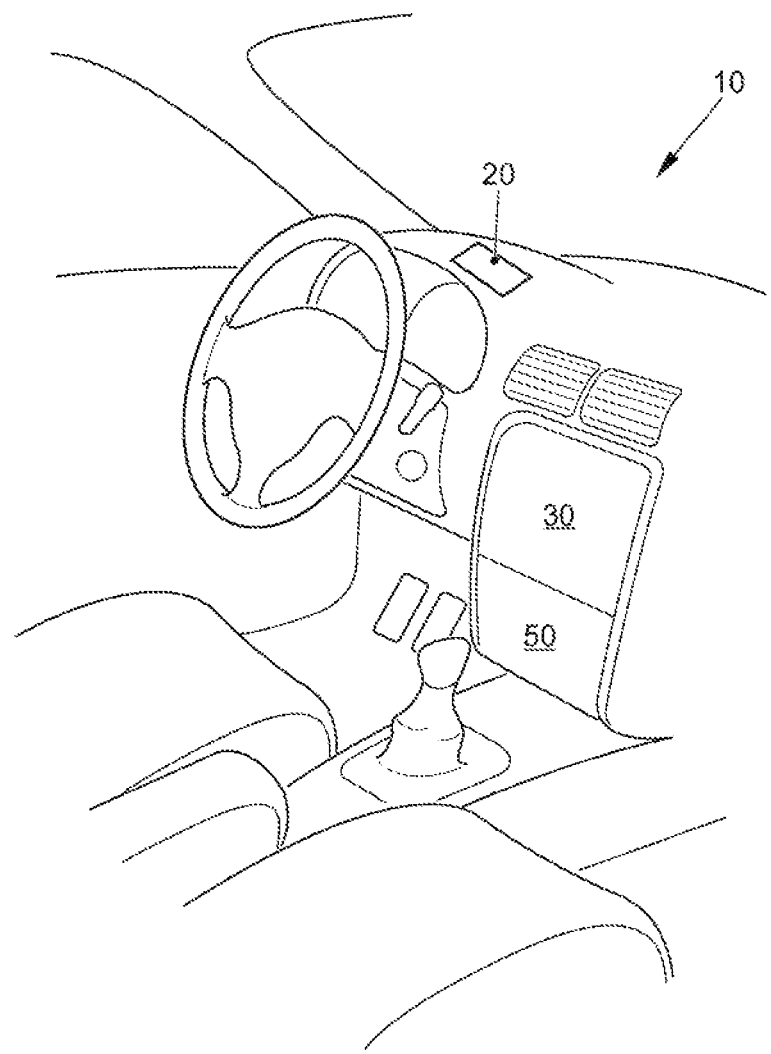
FIG. 2 shows the typical cockpit of a vehicle according to some examples.

FIG. 2 shows the cockpit of the vehicle 10. This is a passenger automobile. Any other vehicle can likewise be used as the vehicle 10. Examples of other vehicles are: busses, utility vehicles, in particular trucks, agricultural machines, construction machines, rail vehicles, etc. The invention can be used in general with land vehicles, rail vehicles, boats, and aircraft.

Three display units of an infotainment system are shown in the cockpit. These include the head-up display 20 and a touchscreen 30, incorporated in the center console. This center console is not within the driver's field of vision when driving. For this reason, the additional information is not displayed on the display unit 30.

The touchscreen 30 is used in particular to operate various functions in the vehicle 10. By way of example, a radio, a navigation system, a playback system for recorded music, and/or an air conditioner, other electronic devices, or other convenience functions or applications in the vehicle can be controlled therewith. This is normally referred to on the whole as an "infotainment system." An infotainment system in motor vehicles, in particular passenger automobiles, refers collectively to a radio, navigation system, hands-free speakerphone, driver assistance system, and other functions in a central operating unit. The term "infotainment" is a portmanteau comprised of the words "information" and "entertainment." For the most part, the touchscreen 30 is used for operating the infotainment system, wherein this screen 30 can be readily seen and operated by the driver of the vehicle 10 in particular, or by a passenger in the vehicle 10. Mechanical operating elements, e.g. buttons, knobs, or combinations thereof, can be located in an input unit 50 below the screen 30. It is typically also possible to operate some of the infotainment system on the steering wheel. This unit is not shown separately, but is regarded as part of the input unit 50.

Figure 3:
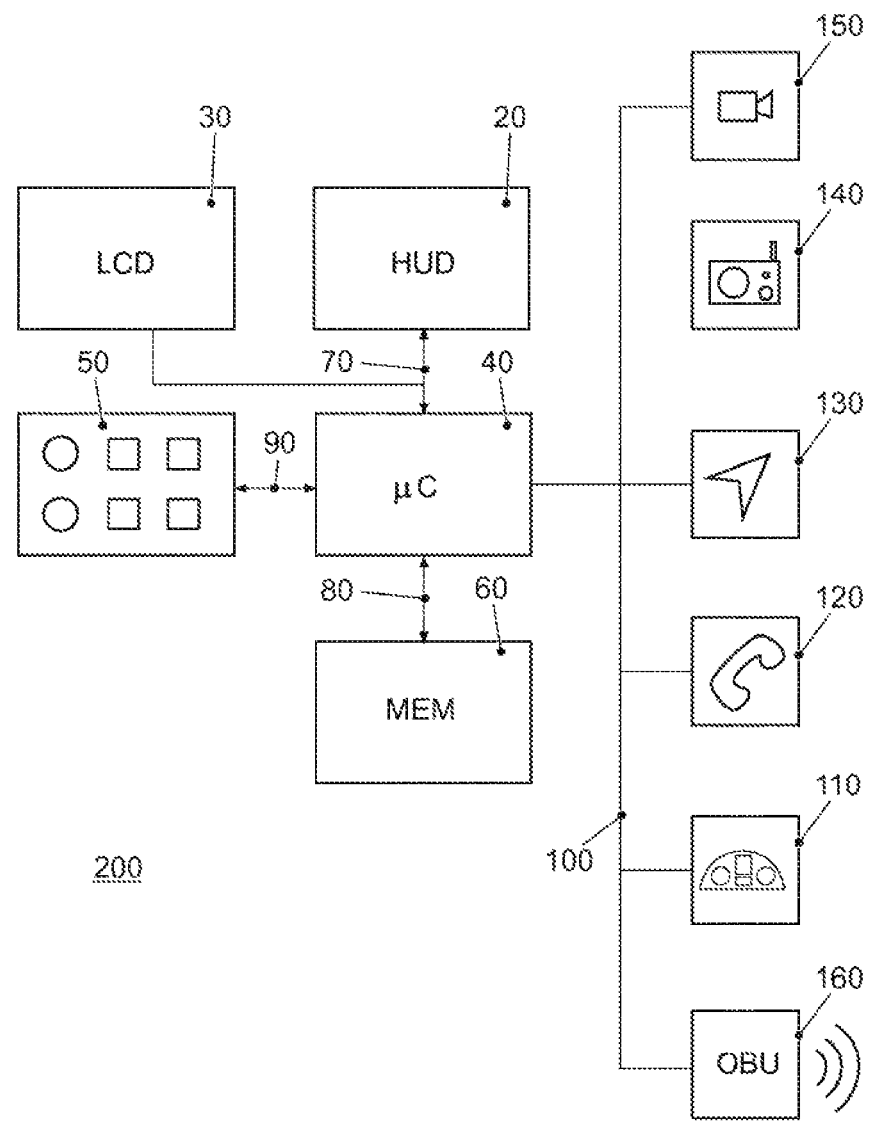
FIG. 3 shows a block diagram of the infotainment system in a vehicle according to some examples.

FIG. 3 shows a schematic illustration of the infotainment system 200 and some exemplary subsystems or applications of the infotainment system. The operating device comprises the touchscreen 30, a computer 40, an input unit 50, and a memory 60. The display unit 30 comprises both a display screen for displaying dynamic graphics as well as an operating surface located above the display surface (a touch-sensitive layer) for inputting commands by a user.

The display unit 30 is connected to the computer 40 via a data line 70. The data line can function according to the LVDS standard (Low Voltage Differential Signaling). The display unit 30 receives control data from the computer 40 via the data line 70 to activate the display surface on the touchscreen 30. Control data for the input commands are also transmitted from the touchscreen 30 to the computer 40 via the data line 70. The reference numeral 50 refers to the input unit. This includes the aforementioned operating elements, e.g. buttons, knobs, sliders, or push-button knobs, by means of which the user can select inputs via a menu. An input is understood in general to mean a selection of a menu option, as well as a modification of parameters, shutting a function on or off, etc.

The memory 60 is connected to the computer 40 via a data line 80. A pictogram index and/or symbol index are stored in the memory 60, containing the pictograms and/or symbols for the possible overlays of additional information. The points/symbols that form the basis for calculating the grid overlay can also be stored here.

The other parts of the infotainment system, such as a camera 150, radio 140, navigator 130, telephone 120, and instrument panel 110 are connected to the device for operating the infotainment system via a data bus 100. The high speed variation of the CAN bus according to the ISO standard 11898-2 can be used as the data bus 100. Alternatively, a bus system based on Ethernet technologies, e.g. BroadR-Reach, can also be used. Bus systems in which the data transfer takes place via fiber optics can also be used. Examples of this are the MOST bus (Media Oriented Systems Transport) or the D2B bus (Domestic Digital Bus). It should also be mentioned here that the camera 150 can be a conventional video camera. In this case, it records 25 full images/second, or 50 half images/second in the interlace recording mode. Alternatively, a special camera can be used that records more images/second, in order to increase the precision of the object recognition with faster moving objects. Numerous cameras can be used for observing the environment. The aforementioned radar and lidar systems can also be used, either in a supplementary manner, or alternatively, for observing the environment, or to expand environment observation. The vehicle 10 is equipped with a communication module 160 for internal and external wireless communication. This module is frequently referred to as an on-board unit. It can be configured for mobile communication, e.g. according to the LTE standard (Long Term Evolution). It can also be configured for WLAN communication (Wireless LAN) if it is configured for communication with the occupants of the vehicle, or for vehicle-to-vehicle communication.

The method according to the invention, for calculating an overlay of additional information to be displayed on a display unit 20, shall be explained below based on an exemplary embodiment.

The same reference symbols in the remaining figures refer to the same fields and symbols described in reference to FIGS. 1 to 3.

It is assumed in the following description of the invention that the driver drives the vehicle 10 with the aid of a driver assistance system. A driver assistance system for longitudinal control of the vehicle 10 is used. Examples of such assistance systems comprise an automatic distance control ACC (Adaptive Cruise Control), and a speed control system GRA (Geschwindigkeitsregelanlage [EN: Speed Control System]). The present disclosure could still be used in the same manner, however, if the vehicle is fully automatically operated. The steps that are taken when the vehicle 10, with an activated longitudinal control system, in this case the ACC system, approaches a preceding vehicle 300, detects this vehicle, and adapts its speed to that of the preceding vehicle 300 are described below. This takes place such that a previously input safe distance is maintained.

The use of a grid-like AR overlay has proven to be effective in providing the information to the driver of a vehicle to aid in longitudinal and transverse control of the vehicle. A grid-like AR overlay is calculated for the route calculated by the navigation system. The driver is shown the route in this manner, without concealing any important information regarding the actual scenery. The fundamental idea and technology of the grid-like AR overlay is explained in the parallel patent application by the applicant, DE 10 2017 212 367, which is incorporated by reference in its entirety herein.

Figure 4:
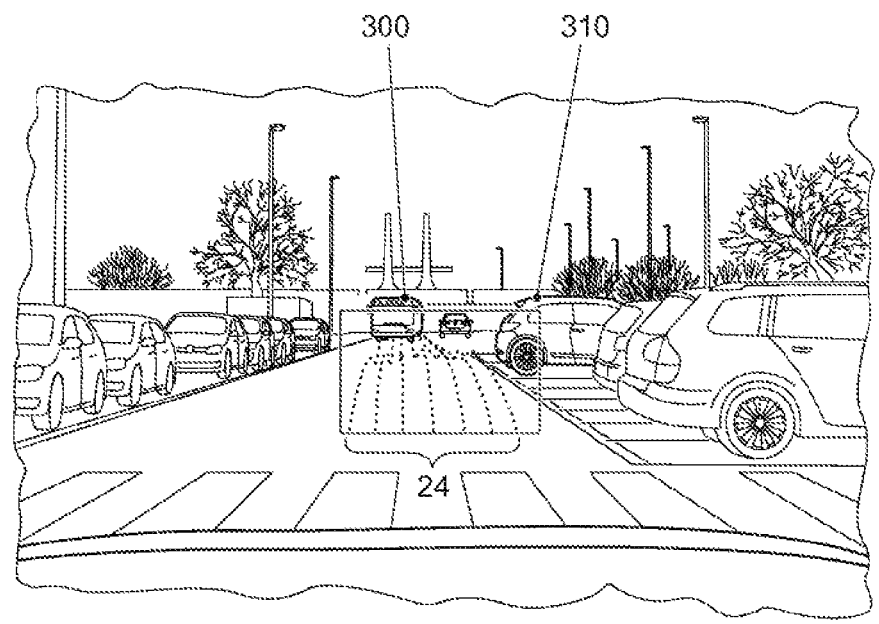
FIG. 4 shows a curved waveform grid overlay indicating the urgency of a hazard in the form of an oncoming vehicle according to some examples.

The basis for the display according to the present disclosure, of the longitudinal and transverse control functions of the vehicle 10 on the HUD 20 is the display of a virtual grid 24 along the route, which can be displayed at a distance above the actual street, or directly on the actual street. The street lies in the driver's field of vision in the form of a real roadway. What is special about this novel proposal is that not only is the route marked by the grid 24, but this grid also shows an associated event on the route. The event comprises approaching a vehicle 300 on the route, such that there is a risk potential based on an estimation of the width of the route and the relative speed at which the observer vehicle 10 approaches the oncoming vehicle 300. The risk potential resulting in the AR overlay of the event in this case is obtained from the relative movement of the two vehicles 10, 300 approaching one another, taking possible objects or obstacles on the side of the road into account, constricting the roadway. When it is estimated that a limit will be exceeded here, attention is drawn to the risk potential. This takes place, as shown in FIG. 4, through the calculation of a spatially expanded AR overlay. The urgency of the risk potential is indicated by the movement of the spatial expansion toward the observer vehicle 10 from the oncoming vehicle 300. This gives the driver of the observer vehicle 10 the impression of an approaching wave. One or more waves can be depicted moving toward the observer vehicle 10. The AR overlay preferably depicts a perspective view. A wave crest consequently increases in size as it approaches the observer vehicle 10, increasingly indicating the urgency of the upcoming hazard.

Figure 5:
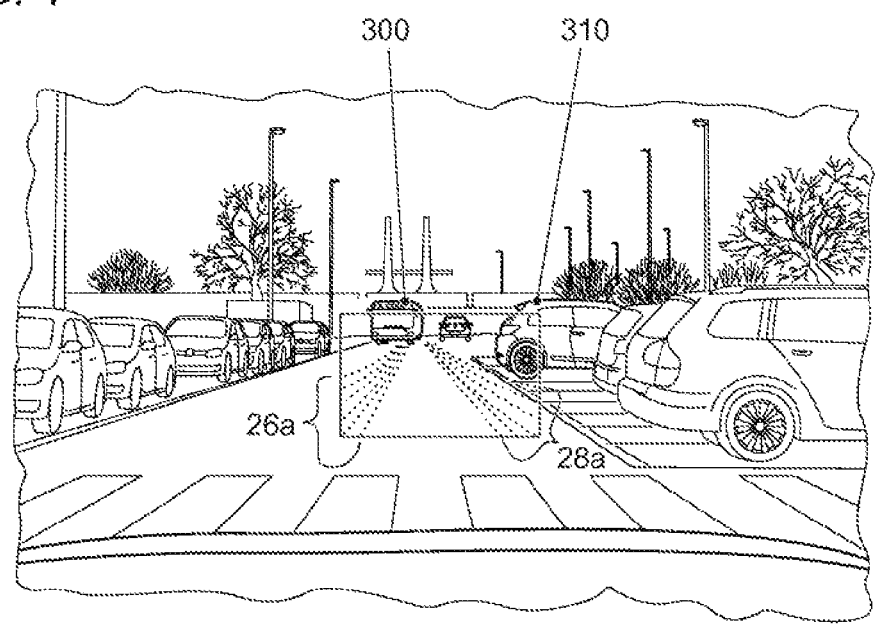
FIG. 5 shows a grid overlay emphasizing a narrowing of the route according to some examples.

FIG. 5 shows an example of an AR overlay that indicates the upcoming narrowing of the roadway. This shows a left-hand grid 26a and a right-hand grid 28a overlaid alongside the roadway. These grids extend from the observer vehicle 10 to the oncoming or preceding vehicle 300. The upcoming narrowing is indicated in that the grids 26a and 28a are spatially aggregated toward the edges. The spatial piling preferably takes place such that it increases in front of the narrow section, and subsides after the narrow section.

Figure 6:
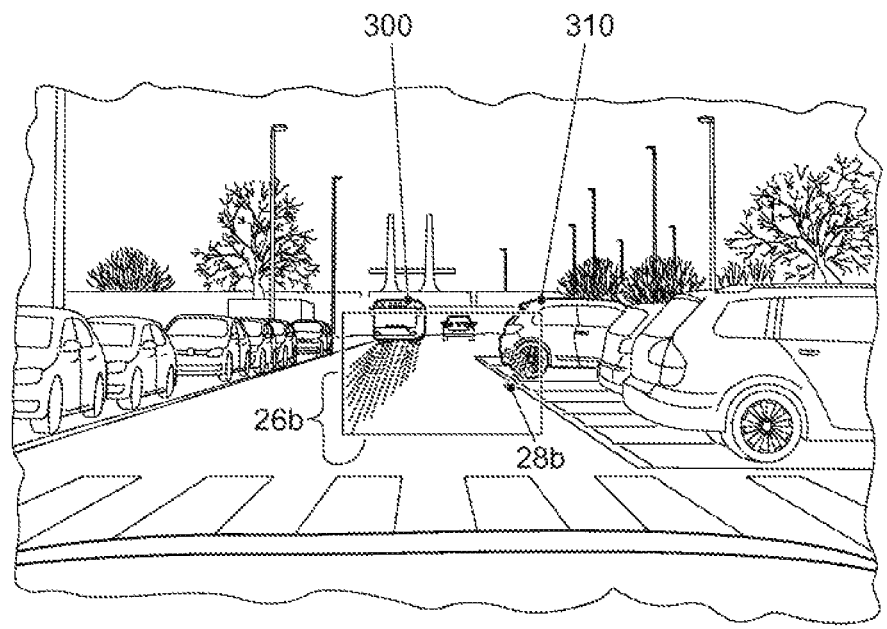
FIG. 6 shows a swarm-like conversion of a grid-like AR overlay indicating a instructions to the driver in the case, e.g., of a narrowing of the route according to some examples.

FIG. 6 shows what happens when the upcoming narrowing of the roadway is estimated by the longitudinal control system such that the risk of a collision or contact with the oncoming vehicle 300 is estimated to be too great. In this case, an AR overlay is calculated that gives the driver instructions for avoiding a collision or contact. The instructions are in the form of a swerving arrow 28b. For the driver to immediately and intuitively understand the instructions, they are not only overlaid at the position where the swerving is to take place, but are also designed specifically with regard to the generation thereof. This generation takes place in that the symbol for the swerving arrow 28b is composed of points from the right-hand grid 28a. The points in the right-hand grid 28a are animated such that they move in the manner of a swarm and ultimately converge to form the swerving arrow 28b.

FIG. 6 also shows that the points in the left-hand grid 26a extend toward the side such that they mark the assumed path of the oncoming vehicle 300.

Figure 7:
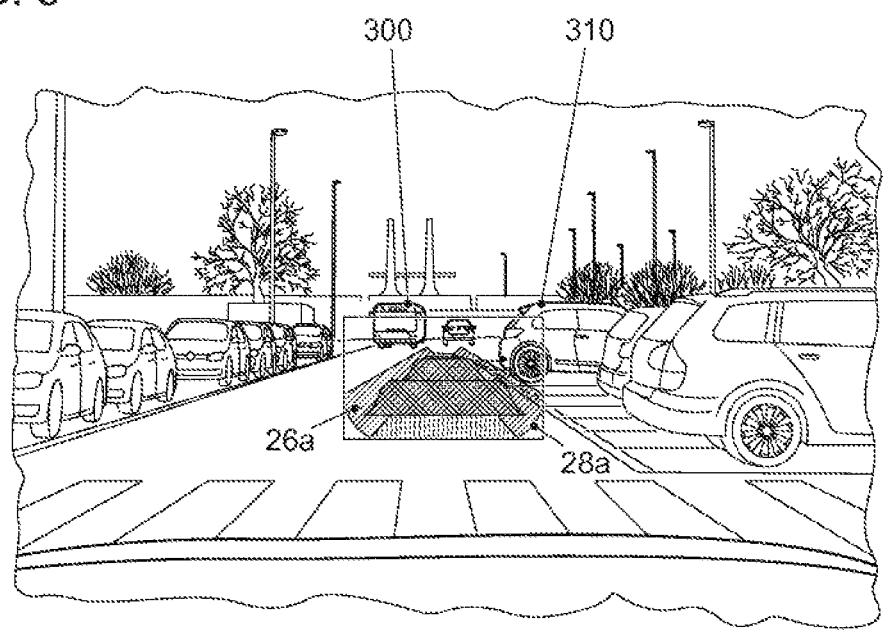
FIG. 7 shows three fundamental levels of AR overlays for driver information according to some examples.

FIG. 7 shows a variant means of combining the various AR overlays. The grid 24 showing the risk potential of an event is overlaid along with the grids 26a and 28a for lateral control. These can be displayed in different colors to make them more readily distinguishable. In this example, the grid 24 is red, and the grids 26a and 28a are yellow. When the lateral control grids 26a or 28a convert to a notification symbol, instead of the lateral control grid 28a, the corresponding notification symbol can be overlaid along with the grid 24.

Figure 8:
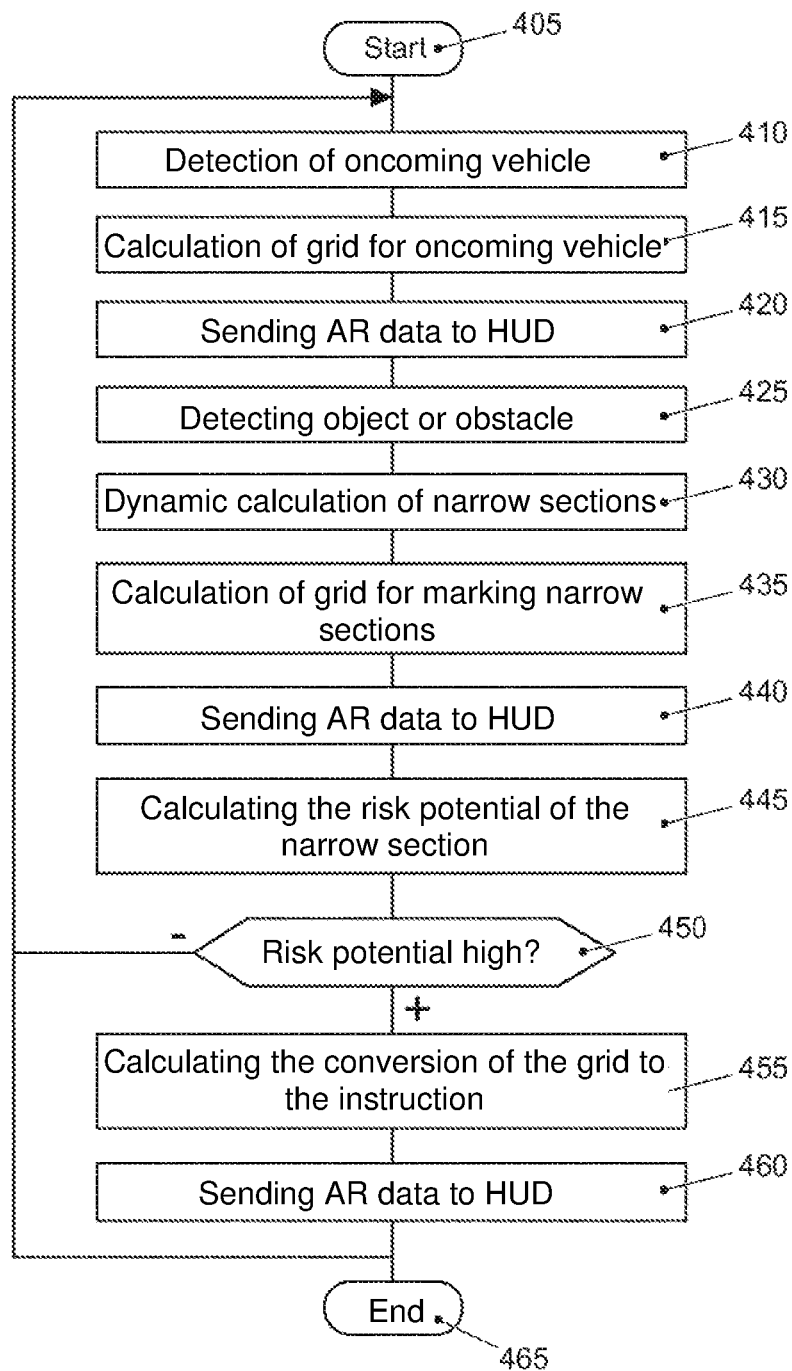
FIG. 8 shows a flow chart for a program for calculating the AR overlays for the three fundamental levels according to some examples.

A computer program for calculating the AR overlays shall now be explained in reference to FIG. 8. The program is executed in the computer 40. The start of the program is indicated by the reference numeral 405. Detection of an oncoming vehicle 300 takes place in step 410. The images from the camera 150 are evaluated for this with an object recognition algorithm. The distance to the oncoming vehicle 300 as well as the relative speed between the observer vehicle 10 and the oncoming vehicle 300 are estimated. The momentary speed of the oncoming vehicle can be estimated by continuous image evaluation of the camera 150 images. In another embodiment, the momentary speed can be transmitted from the oncoming vehicle 300 to the observer vehicle 10 via car-2-car communication. After the oncoming vehicle 300 has been recognized, and the distance and relative speed have been estimated, the grid 24 with the corresponding spatial expansion is calculated in step 415. The grid 24 is preferably calculated in a perspective view. The calculation also takes place such that the grid expands toward the oncoming vehicle 300. The data calculated for the grid 24 are sent to the head-up display 20 in step 420. This overlays the grid 24, as is illustrated in FIG. 4. Objects or obstacles on the roadside are detected in step 425. As is shown in FIGS. 4, 5 and 6, vehicles are parked in parking spaces on the right side of the road. Narrow sections are dynamically calculated in step 430. This takes place as follows: The parked vehicle 310 is still at some distance to the observer vehicle 10. The oncoming vehicle 300 moves such that it will reach the parked vehicle 310 along the road when the observer vehicle 10 passes by the parked vehicle 310. The oncoming vehicle 300 and the observer vehicle 10 will both reach a narrow section on the road when they reach the parked vehicle 310. This is how the dynamic calculation of narrow sections is to be understood. The grids 26a and 28a for marking a narrow section are calculated in step 435. The lateral placement of the grids is such that they rise toward the calculated narrow section, and recede after the calculated narrow section. These grids 26a and 28a are also calculated in a perspective view. The calculated data for the grids 26a and 28a are sent to the head-up display 20 in step 440.

The risk potential at the detected narrow section is calculated in step 445. If the narrow section calculated in the subsequent step 450 is less than a specific width, e.g. the width of the observer vehicle 10, the animation for the conversion of the lateral control grid 38a to a swerving symbol 28a is calculated in step 455. As explained above, the animation comprises the points in the grid 28a moving in a swarm to ultimately form the swerving symbol. If no risk potential has been detected, the program returns to step 410. The data calculated for the AR overlay are sent to the HUD 20 in step 460. A loop is formed by the steps 410 to 460 in the program, which is run until there is a change of state. The state change is when the driver assumes control and abandons the convenience function, or parks the car. The program then ends in step 465.

All of the examples specified herein, as well as specific formulations are to be understood as not limited to these specific examples. Persons skilled in the art will realize, for example, that the block diagram shown here represents a conceptual view of an exemplary circuit arrangement. Similarly, it should be noted that any flow charts, state transition diagrams, pseudo codes, etc. represent various variants for depicting processes, substantially stored in computer-readable media, such that they can be executed by a computer or processor. The object specified in the claims can also expressly be a person.

It should be understood that the proposed method and the associated devices can be implemented in the form of hardware, software, firmware, special processors, or a combination thereof. Special processors can comprise application-specific integrated circuits (ASICs), a reduced instruction set computer (RISC), and/or field-programmable gate arrays (FPGAs). The proposed method and the device are preferably implemented as a combination of hardware and software. The software is preferably installed as an application on a program memory. This is typically a computer platform machine that has hardware, e.g. one or more central processing units (CPUs), a random-access memory (RAM), and one or more input/output (I/O) interface(s). An operating system is also normally installed on the computer platform. The various processes and functions that have been described herein can be part of the application or a component executed by the operating system.

The disclosure is not limited to the exemplary embodiments described herein. There is room for various adaptations and modifications that a person skilled in the art would take into account based on his knowledge and also regard as belonging to the disclosure.

The invention has been explained in greater detail in reference to the exemplary embodiments using the use thereof in vehicles by way of example. The invention can also be used in airplanes and helicopters, e.g. during landing maneuvers, or searches, etc.

It should also be noted that the use is not limited thereto. The invention can also be used any time that an AR overlay is to be used to augment the field of vision of a driver, an operator, or even just a person wearing data glasses.

With remote controlled devices as well, e.g. robots, in which the remote control takes place via a monitor that displays a camera image, AR overlays can also facilitate operation. This comprises another possible application.

LIST OF REFERENCE SYMBOLS 10 vehicle
20 head-up display
21 virtual projection surface
24 grid
26a left-hand lateral control grid
26b left-hand (converted) lateral control grid
28a right-hand lateral control grid
30 touchscreen
40 computer
50 input unit
60 memory
70 data line to the display
80 data line to the memory
90 data line to the input unit
100 data bus
110 instrument panel
120 telephone
130 navigator
140 radio
150 camera
160 communication module
200 infotainment system
300 oncoming vehicle
310 parked vehicle
405—various
465 program steps

The invention claimed is:

1. A method for generating an augmented reality (AR) overlay of additional information on a display unit, comprising:
    detecting position of an object relative to a vehicle;
    generating a spatially expanded animation graphic for a projection surface of the AR overlay upon approach to the detected position of the object, wherein the animation graphic comprises a grid comprising numerous grid elements projected from a vehicle location to the detected object, and graphic contact information representing a risk potential relative to the object;
    calculating a spatial expansion for the animation graphic to visually depict at least one of a kinematic and/or a dynamic movement of the spatial expansion in the animation graphic; and
    processing the generated spatially expanded animation graphic using the calculated spatial expansion to represent the kinematic and/or the dynamic movement of the spatial expansion, and the graphic contact information representing the risk potential, as an approaching and/or receding wave.

2. The method of claim 1, wherein the at least one of the kinematic or the dynamic movement of the spatial expansion comprises at least one of translatory movement and/or rotational movement.

3. The method of claim 2, further comprising periodically repeating the spatial expansion of the animation graphic to visually depict a number of wave trains that are approaching and/or receding relative to the vehicle.

4. The method of claim 1, wherein generating the spatially expanded animation graphic comprises overlaying one or more animation graphics on a side of a road to assist in a lateral control of the vehicle.

5. The method of claim 4, wherein the spatial expansion is calculated such that the grid extends upward at the side of the detected object, in order to indicate a narrowing of a road.

6. The method of claim 5, further comprising estimating a width of the narrowing of the road,
    wherein the animation graphic is generated if the estimated width is less than a minimum width, such that the at least one grid-like animation graphic for lateral control of the vehicle is converted to a notification symbol that which indicates the necessity of an evasive maneuver.

7. The method of claim 6, wherein the converting of the animation graphic is calculated such that the grid elements of the animation graphic for aiding in lateral control move in the manner of a swarm during a conversion phase, resulting in the converted notification symbol.

8. The method of claim 7, wherein other animation graphics are generated to aid in the lateral control of the vehicle such that a path of the detected object is indicated.

9. An apparatus for generating an augmented reality (AR) overlay of additional information on a display unit, comprising:
    a display unit;
    a detection device for detecting position of an object relative to a vehicle; and
    a computer for generating a spatially expanded animation graphic for a projection surface of the AR overlay upon approach to the detected position of the object, wherein the animation graphic comprises a grid comprising numerous grid elements projected from a vehicle location to the detected object, and graphic contact information representing a risk potential relative to the object, wherein the computer is further configured to calculate a spatial expansion for the animation graphic to visually depict at least one of a kinematic and/or a dynamic movement of the spatial expansion in the animation graphic, and wherein the computer is further configured to process the generated spatially expanded animation graphic using the calculated spatial expansion to represent the kinematic and/or the dynamic movement of the spatial expansion, and the graphic contact information representing the risk potential, as an approaching and/or receding wave.

10. The apparatus of claim 9, wherein the at least one of the kinematic or the dynamic movement of the spatial expansion comprises at least one of translatory movement and/or rotational movement.

11. The apparatus of claim 10, wherein the computer is configured to periodically repeat the spatial expansion of the animation graphic to visually depict a number of wave trains that are approaching and/or receding relative to the vehicle.

12. The apparatus of claim 9, wherein the computer is configured to generate the spatially expanded animation graphic by overlaying one or more animation graphics on a side of a road to assist in a lateral control of the vehicle.

13. The apparatus of claim 12, wherein the computer is configured to calculate the spatial expansion such that the grid extends upward at the side of the detected object, in order to indicate a narrowing of a road.

14. The apparatus of claim 13, wherein the computer is further configured to estimate a width of the narrowing of the road, and wherein the computer is configured to generate the animation graphic is generated if the estimated width is less than a minimum width, such that the at least one grid-like animation graphic for lateral control of the vehicle is converted to a notification symbol that which indicates the necessity of an evasive maneuver.

15. The apparatus of claim 14, wherein the computer is configured to convert the animation graphic such that the grid elements of the animation graphic are configured to aid in lateral control move in the manner of a swarm during a conversion phase, resulting in the converted notification symbol.

16. The apparatus of claim 9, wherein the computer is configured to generate other animation graphics to aid in the lateral control of the vehicle such that a path of the detected object is indicated.

17. An article of manufacture for use by a vehicle, the article comprising:

a non-transitory computer-readable medium having stored therein instructions executable by one or more processors of the vehicle to:

detect a position of an object relative to a vehicle;

generate a spatially expanded animation graphic for a projection surface of the AR overlay upon approach to the detected position of the object, wherein the animation graphic comprises a grid comprising numerous grid elements projected from a vehicle location to the detected object, and graphic contact information representing a risk potential relative to the object; and calculate a spatial expansion for the animation graphic to visually depict at least one of a kinematic and/or a dynamic movement of the spatial expansion in the animation graphic, and process the generated spatially expanded animation graphic using the calculated spatial expansion to represent the kinematic and/or the dynamic movement of the spatial expansion, and the graphic contact information representing the risk potential, as an approaching and/or receding wave.

18. The article of manufacture of claim 17, wherein the at least one of the kinematic or the dynamic movement of the spatial expansion comprises at least one of translatory movement and/or rotational movement.

* * * * *